United States Patent
Yang (10) Patent No.: US 12,196,991 B2
(45) Date of Patent: Jan. 14, 2025

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wenhua Yang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 197 days.

(21) Appl. No.: 17/623,976

(22) PCT Filed: Dec. 17, 2021

(86) PCT No.: PCT/CN2021/138985
§ 371 (c)(1),
(2) Date: Dec. 30, 2021

(87) PCT Pub. No.: WO2023/103029
PCT Pub. Date: Jun. 15, 2023

(65) Prior Publication Data
US 2023/0185006 A1    Jun. 15, 2023

(30) Foreign Application Priority Data
Dec. 10, 2021    (CN) ................... 202111508946.5

(51) Int. Cl.
*G02B 5/30* (2006.01)

(52) U.S. Cl.
CPC .................. *G02B 5/3016* (2013.01)

(58) Field of Classification Search
CPC ...... G02B 5/3016; G02B 5/3033; G02B 1/14; G02B 1/08; G02B 1/113; G06F 3/041;
(Continued)

(56) References Cited

U.S. PATENT DOCUMENTS

2003/0202137 A1 * 10/2003 Nakamura ............. G02B 1/111
                                                        349/96
2009/0189857 A1    7/2009 Benko et al.
(Continued)

FOREIGN PATENT DOCUMENTS

CN    100394225 C  *  6/2008  .......... G02B 5/3083
CN    107430238 A    12/2017
(Continued)

OTHER PUBLICATIONS

International Search Report in International application No. PCT/CN2021/138985, mailed on May 30, 2022.
(Continued)

*Primary Examiner* — Hoan C Nguyen
(74) *Attorney, Agent, or Firm* — Rivka Friedman (57) ABSTRACT

A display device includes a display panel and a polarizer positioned above the display panel. The display panel includes a flat-surface part having a flat state and a curved-surface part having a curved state. The flat-surface part is adjacent to the curved-surface part. The polarizer includes a first polarization region corresponding to the flat-surface part and a second polarization region corresponding to the curved-surface part. The polarizer comprises a hard coating layer, positioned on the first polarization region.

10 Claims, 4 Drawing Sheets

(58) Field of Classification Search
CPC ....... G06F 3/0412; G06F 1/1652; B32B 5/00; H10K 50/8426; H10K 77/111; H10K 59/8722; H10K 59/8791; H05K 7/00; C08J 5/12; G02F 1/133305; G02F 1/13363; G02F 1/133528
See application file for complete search history.

(56) References Cited

U.S. PATENT DOCUMENTS

| | | | | |
|---|---|---|---|---|
| 2013/0127606 | A1* | 5/2013 | Chang | G09G 3/006 340/384.7 |
| 2015/0036269 | A1* | 2/2015 | Kim | H10K 50/8426 361/679.01 |
| 2015/0363030 | A1* | 12/2015 | Nam | G06F 3/041 345/173 |
| 2016/0048169 | A1* | 2/2016 | Yang | G02F 1/133305 361/749 |
| 2016/0155967 | A1* | 6/2016 | Lee | H10K 59/40 257/88 |
| 2018/0149786 | A1* | 5/2018 | Lee | G02B 1/14 |
| 2020/0274104 | A1 | 8/2020 | Park | |

FOREIGN PATENT DOCUMENTS

| | | |
|---|---|---|
| CN | 107688408 A | 2/2018 |
| CN | 110085138 A | 8/2019 |
| CN | 110441943 A | 11/2019 |
| CN | 112241039 A | 1/2021 |
| CN | 112433286 A | 3/2021 |
| CN | 112908174 A | 6/2021 |
| KR | 20070096826 A * | 10/2007 |

OTHER PUBLICATIONS

Written Opinion of the International Search Authority in International application No. PCT/CN2021/138985, mailed on May 30, 2022.

Chinese Office Action issued in corresponding Chinese Patent Application No. 202111508946.5 dated Dec. 23, 2022, pp. 1-7.

* cited by examiner

DISPLAY DEVICE

FIELD OF THE DISCLOSURE

The present disclosure relates to a display technology, and more particularly, to a display device.

BACKGROUND INFORMATION

An organic light emitting diode (OLED) display device is a display device having the best development potential because it has advantages, such as a low driving voltage, a high light emitting efficiency, a short response time, a high resolution and contrast, a wide usage temperature range, a near 180-degree view angle, a flexibility and a huge area full color display.

As the technology progress and the increasing demands, a display device, such as a double-curved-surface display device or a quadruple-curved-surface display device, having a curved state becomes more and more popular. A conventional OLED display device comprises a polarizer for anti-reflection to ensure the operations of the display. The conventional polarizer needs to be pasted on the curved surface when it's adopted in the curved display device. However, the conventional polarizer might be broken when it's being pasted on a large-angle curved surface.

SUMMARY

One objective of an embodiment of the present disclosure is to provide a display device, which could alleviate the issues of breaking a polarizer when the polarizer is being pasted on a large-angle curved surface.

According to an embodiment of the present disclosure, a display device includes a display panel and a polarizer positioned above the display panel. The display panel includes a flat-surface part having a flat state and a curved-surface part having a curved state. The flat-surface part is adjacent to the curved-surface part. The polarizer includes a first polarization region corresponding to the flat-surface part and a second polarization region corresponding to the curved-surface part. The polarizer comprises a hard coating layer, positioned on the first polarization region.

Optionally, the polarizer further comprises a first supporting layer, positioned on the second polarization region. The first supporting layer and the hard coating layer belong to a same layer and are adjacent to each other, and an elongation at break of the first supporting layer is higher than an elongation at break of the hard coating layer.

Optionally, the polarizer further comprises a second supporting layer, positioned between the display panel and the first supporting layer and located in the first polarization region and the second polarization region. The first supporting layer and the second supporting layer have a same material.

Optionally, the second supporting layer is manufactured with cyclo-olefin copolymer or cellulose acetate.

Optionally, the polarizer further comprises a first adhesive layer and a line polarization layer positioned between the display panel and the second supporting layer. The line polarization layer is positioned between the first adhesive layer and the second supporting layer. The first adhesive layer is located in the first polarization region and the second polarization region. The line polarization layer is located in the first polarization region and the second polarization region. Elongations at break of the first adhesive layer and the line polarization layer are both higher than the elongation at break of the hard coating layer.

Optionally, the polarizer further comprises a compensation layer and a second adhesive layer. The compensation layer is positioned between the first adhesive layer and the second adhesive layer. The compensation layer is located in the first polarization region and the second polarization layer. The second adhesive region is located in the first polarization region and the second polarization layer. Elongations at break of the second adhesive layer and the compensation layer are both higher than the elongation at break of the hard coating layer.

Optionally, the second adhesive layer is adjacent to the line polarization layer.

Optionally, the compensation layer is manufactured with cyclo-olefin copolymer or polycarbonate.

Optionally, the polarizer further comprises a third supporting layer, positioned between the second adhesive layer and the line polarization layer. The third supporting layer is located in the first polarization region and the second polarization layer, and the third supporting layer and the second supporting layer comprise a same material.

Optionally, a material of the compensation layer comprises a liquid crystal polymer material.

Optionally, a bending angle of the curved-surface part is larger than 80 degrees.

Optionally, the flat-surface part comprise a first flat-surface part and a second flat-surface part positioned with an interval; and the curved-surface part connects the first flat-surface part to the second flat-surface part.

According to an embodiment of the present disclosure, a hard coating layer is placed in the first polarization region corresponding to the curved-surface part. In this way, it could raise the scratch protection of the polarizer and also raise the bending capability of the polarizer. This could largely reduce the possibility of breaking a polarizer when the polarizer is being pasted on a large-angle curved surface.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided. It will be further understood that the terms "first," "second," "third," and "fourth," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

Embodiment 1

Figure 1:
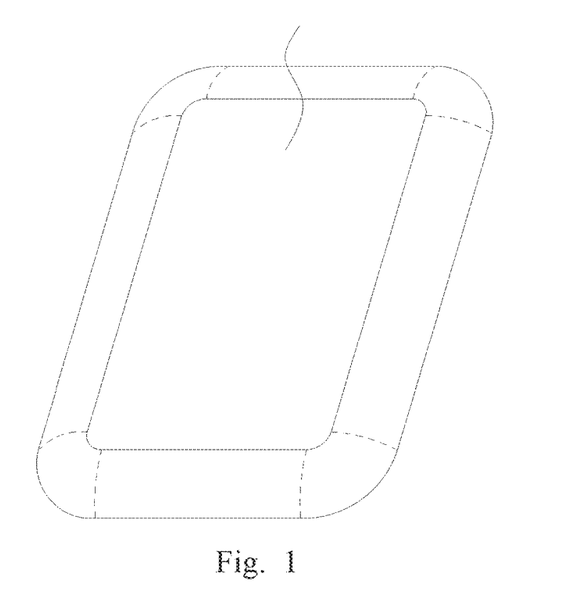
FIG. 1 is a diagram of a display device according to a first embodiment of the present disclosure.

In this embodiment, a display device is provided. The display device is a curved-surface display device. In contrast to a regular flat display device, the curve-surfaced display device has a larger screen-to-body ratio and a better appearance. Please refer to FIG. 1. FIG. 1 is a diagram of a display device according to a first embodiment of the present disclosure. The display device 100 is quadruple-curved-surface display device. The quadruple-curved-surface display device comprises four curved surfaces. However, this is not a limitation of the present disclosure. In another embodiment, the display device 100 could be a double-curved surface display device having two curved surfaces, where the two curved surfaces could be symmetrically placed on top and bottom or right and left.

Figure 2:
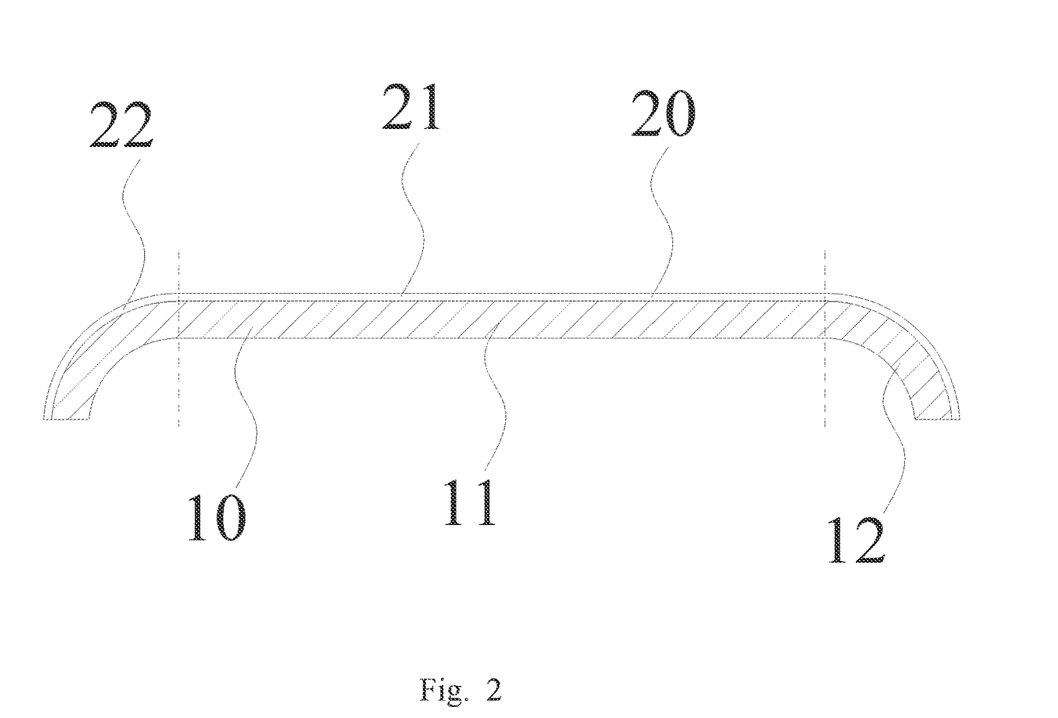
FIG. 2 is a diagram of a stacked structure of a display panel and a polarizer according to the first embodiment of the present disclosure.

Please refer to FIG. 2. FIG. 2 is a diagram of a stacked structure of a display panel and a polarizer according to the first embodiment of the present disclosure. The display device 100 comprises a display panel 10 and a polarizer 20 positioned above the display panel 10. The display panel 10 displays an image through using the pixels to generate light. The light generated by the pixels passes through the polarizer 20 to the user. The polarizer 20 is placed at the light emitting side of the display panel 10 to perform an anti-reflection function to reduce the light generating by reflecting the ambient light by the display interface and improve the display quality. Specifically, the polarizer 20 is a round polarizer and comprises stacked film layer structures. The stacked film layer structure could comprise, for example, a line polarization layer and a compensation layer. The compensation layer is positioned between the display panel and the line polarization layer. The line polarization layer has a polarization direction. Therefore, the line polarization layer could only filter out half of the ambient light. The compensation layer and the line polarization layer have a phase difference. The other half ambient light, which could pass through the line polarization layer, changes after the process of the compensation layer and the reflection by the display panel 10 such that the reflected ambient light cannot pass through the line polarization layer in the polarizer 20. In this way, the reflection issue is solved.

The display panel 10 comprises a flat-surface part 11 having a flat state and a curved-surface part 12 having a curved state. The flat-surface part 11 and the curved-surface part 12 are adjacent to each other. The display panel 10 could be an OLED display panel. The OLED display panel is flexible and bendable and thus could be used to form the curved-surface part 12. The present disclosure does not limit the type of the display panel 10. In another embodiment, the display panel 10 could be an LCD display panel, a micro LED display panel or a mini LED display panel having the flat-surface part 11 and the curved-surface part 12.

The polarizer 20 is pasted on the display panel 10 and has the flat and curved states similar to the display panel 10. Specifically, the polarizer 20 comprises a first polarization region 21 corresponding to the flat-surface part 11 and a second polarization region 22 corresponding to the curved-surface part 12. Preferably, the curvature of the polarizer 20 in the first polarization region 21 is the same as the curvature of the curved-surface part 12 of the display panel 10. It should be noted that there could be some other functional film layers, such as a packaging layer, between the display panel 10 and the polarizer 20.

Figure 3:
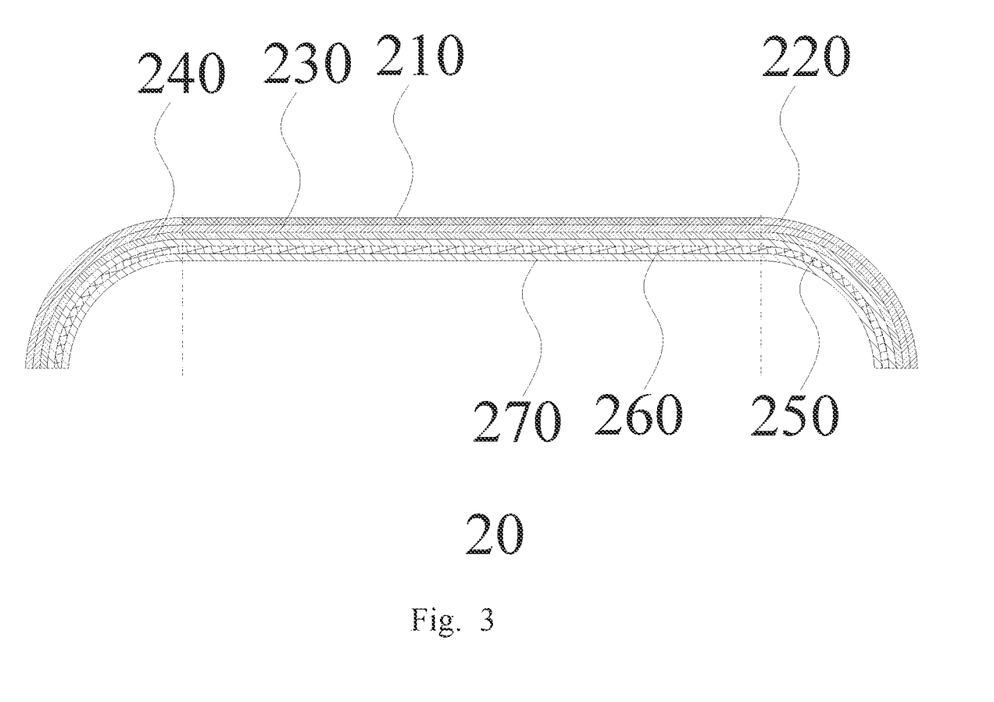
FIG. 3 is a diagram of a polarizer according to the first embodiment of the present disclosure.

Please refer to FIG. 3. FIG. 3 is a diagram of a polarizer according to the first embodiment of the present disclosure. The polarizer 20 comprises a hard coating layer. The hard coating layer 210 is in the first polarization region 21 and is often formed on the supporting layer, made with Triacetate Cellulose (TAC) or cyclic olefin polymer (COP), through a coating process. The hard coating layer is used as hard coated layer to protect the inner structure of the polarizer from scratching. Taking the supporting layer of TAC as an example. The elongation at break of the supporting layer without the hard coating layer and related data are measured and listed in Table 1. The elongation at break of the supporting layer with the hard coating layer and related data are measured and listed in Table 2.

TABLE 1

| Number | Tensile resistance (Mpa) | Elongation at break (%) | Elastic modulus (Mpa) |
|---|---|---|---|
| 1 | 121.59 | 5.04 | 3200 |
| 2 | 124.76 | 5.77 | 3200 |
| 3 | 122.06 | 5.84 | 3100 |
| 4 | 90.63 | 3.02 | 3200 |
| 5 | 126.35 | 6.64 | 3200 |
| 6 | 110.16 | 4.09 | 3300 |
| 7 | 130.16 | 10.23 | 3100 |
| 8 | 137.94 | 16.90 | 3000 |
| 9 | 124.29 | 6.32 | 3200 |
| Average | 120.88 | 7.09 | 3167 |

TABLE 2

| Number | Tensile resistance (Mpa) | Elongation at break (%) | Elastic modulus (Mpa) |
|---|---|---|---|
| 1 | 58.59 | 1.90 | 3300 |
| 2 | 71.10 | 2.24 | 3400 |
| 3 | 46.40 | 2.10 | 3300 |
| 4 | 57.81 | 1.78 | 3400 |
| 5 | 65.75 | 2.17 | 3300 |
| 6 | 70.41 | 2.16 | 3300 |
| 7 | 63.15 | 2.03 | 3400 |

TABLE 2-continued

| Number | Tensile resistance (Mpa) | Elongation at break (%) | Elastic modulus (Mpa) |
| --- | --- | --- | --- |
| 8 | 76.44 | 2.50 | 3400 |
| 9 | 64.38 | 1.97 | 3400 |
| Average | 63.77 | 2.09 | 3356 |

From the data shown in Table 1 and Table 2, the average of the elongation at break of the supporting layer alone is higher as 7.09%. The composite film layers having the supporting layer and the hard coating layer has a lower average elongation at break of 2.09%. This means that when the polarizer without the hard coating layer is bended, the polarizer does not have the breaking issue. However, when the polarizer with a whole hard coating layer is bended, the polarizer basically has the breaking issue.

Therefore, if the hard coating layer 210 is positioned on the second polarization region 22 having the curved state, it increases the breaking risk of the polarizer 20. The elongation at break of the film layers directly reflects the breaking risk of the film layers when the film layers are bended. The lower the elongation at break is, the higher the breaking risk is. The higher the elongation at break is, the lower the breaking risk is. Therefore, in order to ensure the adaption between the polarizer 20 and the curved-surface display panel, reduce the breaking risk of the polarizer 20 and ensure the stability of the display device 100, the display device 100 has the hard coating layer 210 only on the flat-surface part 11. That is, the display device 100 does not have the hard coating layer 210 in the second polarization region 22 corresponding to the curved-surface part 12. Accordingly, the stability and display quality of the display device 100 are raised.

The polarizer 20 further comprises a first supporting layer 220. The first supporting layer 220 is in the second polarization region 22. The first supporting layer 220 and the hard coating layer 210 belong to the same layer and are adjacent to each other. Specifically, the elongation at break of the first supporting layer 220 is higher than the elongation at break of the hard coating layer 210 such that the film layers of the second polarization layer 22 may not be broken because the hard coating layer is not positioned on the second polarization region 22. In addition, because the first supporting layer 220 and the hard coating layer 210 belong to the same layer, and are adjacent to each other and located at the outermost side of the polarizer 20. This could raise the evenness of the polarizer 20 to ensure the filming effect of other film layers formed on the polarizer 20. Furthermore, the first supporting layer 220 could prevent the film layers from being shrunk and protect the polarizer from moisture, UV light and other external materials. This could ensure the endurance of the polarizer 20 and maintain the strength of the entire polarizer even if the hard coating layer 210 is removed from the second polarization region 22 of the polarizer 20. The first supporting layer 220 could be manufactured with cyclo-olefin copolymer or cellulose acetate.

In this embodiment, the polarizer 20 further comprises a second supporting layer 230 positioned between the first supporting layer 220 and the display panel 10. The second supporting layer 230 is in the first polarization region 21 and the second polarization region 22 and the elongation at break of the second supporting layer 230 is higher than the elongation at break of the hard coating layer 210 such that the breaking risk of the second supporting 230 in the second polarization region 22 is lower. This could ensure the stability and the display quality of the display panel 10. The second supporting 230 could be a supporting body of the line polarization layer of the polarizer 20 to make the line polarization layer 240 maintain a stable state such that the optical effect could be ensured. In addition, it could also protect the line polarization layer from moisture, UV light and other external material. The second supporting layer 230 could be manufactured with cyclo-olefin copolymer or cellulose acetate. Preferably, the second supporting layer 230 and the first supporting layer 220 are manufactured with the same material. Because the second supporting layer 230 and the first supporting layer 220 are manufactured with the same material, the first supporting layer 220 and the second supporting layer 230 could be formed by the same process such that the manufacturing process complexity and the manufacturing cost of the polarizer 20 are reduced. Specifically, the second supporting layer 230 and the first supporting layer 220 are manufactured with cyclo-olefin copolymer. In contrast with cellulose acetate, cyclo-olefin copolymer has better mechanical properties and a higher elongation at break. Thus, cyclo-olefin copolymer could further raise adaption between the polarizer 20 and the curved display panel, reduce the breaking possibility of the film layers, and raise the stability and display quality of the display device 100.

In this embodiment, the polarizer 20 further comprises a first adhesive layer 270 and a line polarization layer 240. The line polarization layer 240 is positioned between the first adhesive layer 270 and the second supporting layer 230. The first adhesive layer 270 is positioned in the first polarization region 21 and the second polarization region 22. The line polarization layer 240 is positioned in the first polarization region 21 and the second polarization region 22. The elongations at break of the first adhesive layer 270 and the line polarization layer 240 are both higher than the elongation at break of the hard coating layer 210 such that the second polarization region 22 with the first adhesive layer 270 and the line polarization layer 240 could have a lower breaking risk. This ensures the stability and the display quality of the display panel 10. Specifically, the first adhesive layer 270 is used to fix the polarizer 20 to the display panel. The line polarization layer 240 is used to generate the line polarized light. The first adhesive layer 270 could be manufactured with Pressure-sensitive adhesive (PSA). The line polarization layer 240 could be manufactured with polyvinyl alcohol (PVA).

In this embodiment, the polarizer 20 further comprises a compensation layer 260 and a second adhesive layer 250 positioned between the first adhesive layer 270 and the line polarization layer 240. The compensation layer 260 is positioned between the first adhesive layer 270 and the second adhesive layer 250. The compensation layer 260 is positioned in the first polarization region 21 and the second polarization region 22. The second adhesive layer 250 is positioned in the first polarization region 21 and the second polarization region 22. The elongations at break of the compensation layer 260 and the second adhesive layer 250 are both higher than elongation at break of the hard coating layer 210 such that the second polarization region 22 with the compensation layer 260 and the second adhesive layer 250 could have a lower breaking risk. This ensures the stability and the display quality of the display panel 10. Specifically, the compensation layer 260 and the line polarization layer 240 have a phase difference such that the polarizer 20 has the function of the round polarizer to reduce the reflection rate of the ambient light at the display device 100 and thus raise the display quality of the display panel 10.

The compensation layer 260 could be manufactured with at least one of COP, Polycarbonate (PC) and liquid crystal polymer material. The second adhesive layer 250 is manufactured with PSA.

Furthermore, in the actual test, the polarizer having the COP/PC compensation layer has an elongation at break comparatively higher than the elongation at break of the polarizer having the LC polymer material compensation layer. This reason why is because the number of film layers of the LC polymer material compensation layer is greater. That is, an additional supporting layer should be added between the line polarization layer and the compensation layer in the LC polymer material compensation layer. Therefore, in this embodiment, the second adhesive layer 250 and the line polarization layer 240 are adjacent. The compensation layer 260 is manufactured with COP or PC. In this case, because there is no need to further include an additional supporting layer between the second adhesive layer 250 and the line polarization layer 240. A lower number of film layers could effectively raise the bending performance of the polarizer 20 such that the breaking possibility of the film layers when the polarizer 20 and the curved display panel are used together.

Furthermore, the compensation layer 260 could be manufactured with PC. In the actual test, the elongation at break of the polarizer having the PC compensation layer is 4.51%. The elongation at break of the polarizer having the COP compensation layer is 3.49%. From the above numbers, it could be seen that the PC compensation layer 21 has a better mechanical properties in contrast to the COP compensation layer 21. For example, the PC compensation layer 21 has a higher elongation at break and thus could raise the adaption between the polarizer 20 and the curved display panel, reduce the breaking possibility of the film layers, and raise the stability and the display quality of the display device 100.

In this embodiment, the bending angle of the curved-surface part 12 of the display panel 10 is greater than 80 degrees. If the bending angle of the curved-surface part 12 of the display panel 10 is greater, then the required bending properties of the polarizer 20 need to be better. In this embodiment, the polarizer 20 removes the hard coating layer 210 in the second polarization region 22 and only includes the hard coating layer 210 in the first polarization region 21 in the display panel. This could effectively raise the bending performance of the polarizer 20 such that the polarizer 20 could have a lower breaking risk even if the bending angle of the curved-surface part 12 of the display panel 10 is greater than 80 degrees. This raises the yield of the display device. Preferably, the bending angle of the curved-surface part 12 is greater than 80 degrees but smaller than or equal to 90 degrees.

Embodiment 2

Figure 4:
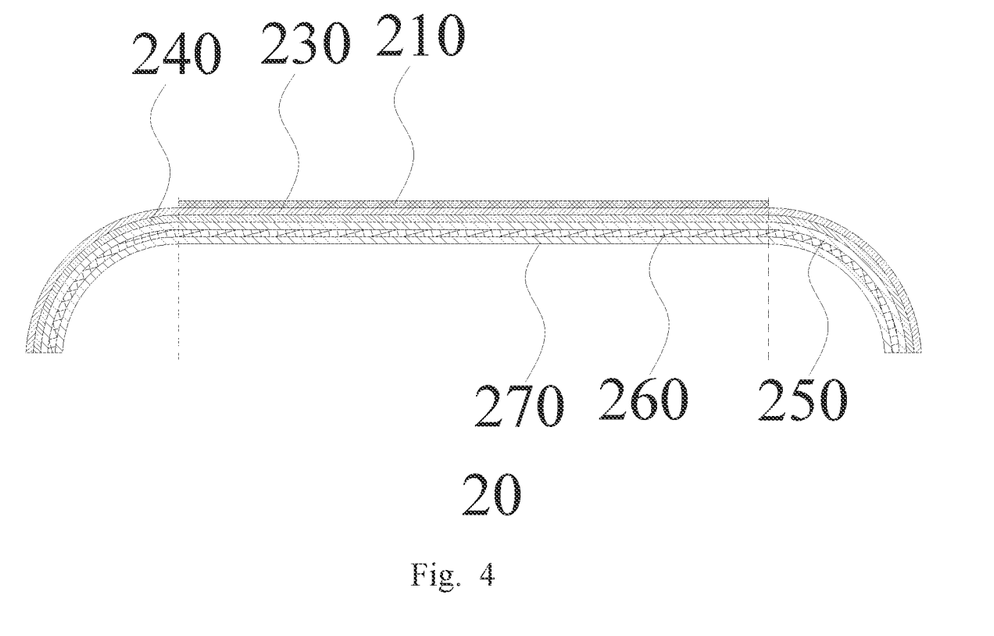
FIG. 4 is a diagram of a polarizer according to a second embodiment of the present disclosure.

Please refer to FIG. 4. FIG. 4 is a diagram of a polarizer according to a second embodiment of the present disclosure. As shown in FIG. 4, the polarizer 20 comprises a first adhesive layer 270, a compensation layer 260, a second adhesive layer 250, a line polarization layer 240, a second supporting layer 230 and a hard coating layer 210 orderly staked on the display panel 10. Here, the hard coating layer 210 is positioned in the first polarization region 21. The other film layers are positioned in the first polarization region 21 and the second polarization region 22. Because the structure of the polarizer 20 in the second embodiment is similar to the structure of the polarizer 20 in the first embodiment, further illustrations for the same components are omitted here.

The difference is: the polarizer 20 does not comprise the first supporting layer on the second supporting layer 230 in the second polarization region 22. Because the hard coating layer 210 is also positioned in the first polarization region 21, the bending performance of the polarizer 20 could still be raised to ensure the adaption between the polarizer 20 and the curved display panel. In addition, because the first supporting layer is not included, the related manufacturing processes, such as patterning process, are not required. Thus, the manufacturing complexity of the polarizer 20 could be further reduced and the manufacturing cost is reduced.

Embodiment 3

Figure 5:
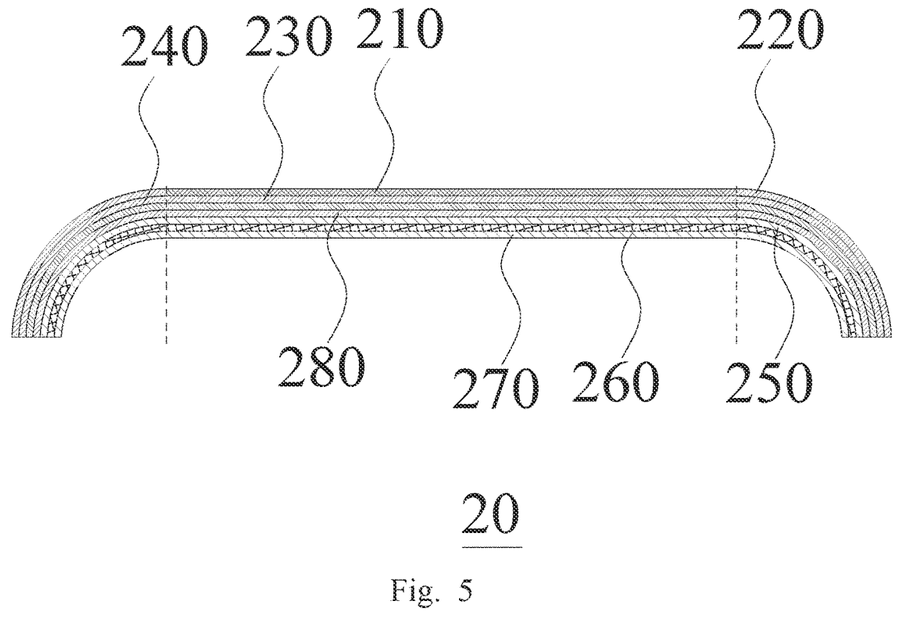
FIG. 5 is a diagram of a polarizer according to a third embodiment of the present disclosure.

Please refer to FIG. 5. FIG. 5 is a diagram of a polarizer according to a third embodiment of the present disclosure. As shown in FIG. 5, the polarizer 20 comprises a first adhesive layer 270, a compensation layer 260, a second adhesive layer 250, a line polarization layer 240, a second supporting layer 230, a hard coating layer 210 and a first supporting layer 220 orderly staked on the display panel 10. The hard coating layer 210 is positioned in the first polarization region 21. The first supporting layer 220 is positioned in the second polarization 22. The hard coating layer 210 and the first supporting layer 220 belong to the same layer and are adjacent to each other. All the other film layers are positioned in the first polarization region 21 and the second polarization region 22.

Unlike the polarizer 20 of the first embodiment, the polarizer 20 of the third embodiment further comprises a third supporting layer 280 positioned between the second adhesive layer 250 and the line polarization layer 140. The third supporting layer 280 is positioned in the first polarization region 21 and the second polarization region 22. The elongation at break of the third supporting layer 280 is higher than the hard coating layer 210 such that the second polarization region 22 with the third supporting layer 280 has lower breaking possibility. This ensures the stability and the display quality of the display panel. Preferably, the third supporting layer 280, the first supporting layer 220 and the second supporting layer 230 are manufactured with the same material.

In this embodiment, the material for forming the compensation layer 260 at least comprises the LC polymer material. That is, the compensation layer 260 is an LC polymer compensation film. The LC polymer compensation film comprises a substrate and a coated layer of LC polymer formed on the substrate. The LC polymer compensation film could be thinner with the same optical effect in contrast to the COP/PC compensation film.

Embodiment 4

Figure 6:
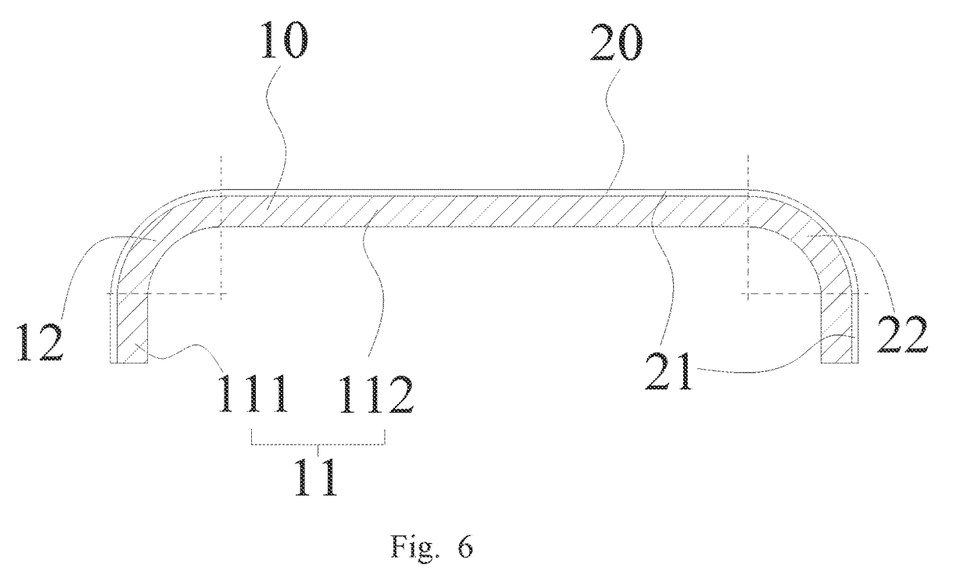
FIG. 6 is a diagram of a stacked structure of a display panel and a polarizer according to the fourth embodiment of the present disclosure.
Figure 7:
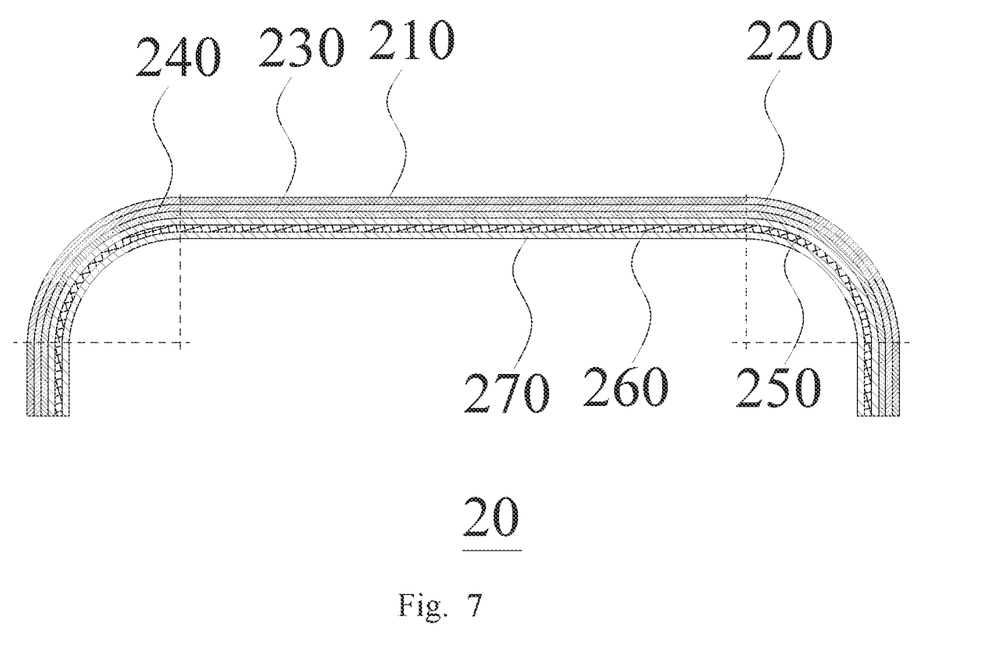
FIG. 7 is a diagram of a polarizer according to the fourth embodiment of the present disclosure.

Please refer to FIG. 6 and FIG. 7. FIG. 6 is a diagram of a stacked structure of a display panel and a polarizer according to the fourth embodiment of the present disclosure. FIG. 7 is a diagram of a polarizer according to the fourth embodiment of the present disclosure. The display panel 10 comprises a flat-surface part 11 having a flat state and a curved-surface part 12 having a curved state. The flat-surface part 11 and the curved-surface part 12 are adjacent to each other. The polarizer 20 comprises a first adhesive layer 270, a compensation layer 260, a second adhesive layer 250, a line polarization layer 240, a second supporting layer 230, a hard coating layer 210 and a first supporting layer 220 orderly staked on the display panel 10. The hard coating layer 210 is positioned in the first polarization region 21. The first supporting layer 220 is positioned in the second polarization region 22. The hard coating layer 210 and the first supporting layer 220 belong to the same layer and are adjacent to each other. The other film layers are all positioned in the first polarization region 21 and the second polarization region 22. Because the structure of the polarizer 20 in the fourth embodiment is similar to the structure of the polarizer 20 in the first embodiment, further illustrations for the same components are omitted here.

The flat-surface part 11 comprises a first flat-surface part 111 and a second flat-surface part 112 positioned with an interval. The curved-surface part 12 connects the first flat-surface part 111 to the second flat-surface part 112. Please note, the present disclosure does not limit the type of the polarizer 20 having the first flat-surface part 111 and the second flat-surface part 112 on the display panel 10. In another embodiment, the display panel 10 could further include the polarizer of the second embodiment or the third embodiment.

The present disclosure provides a display device. The display device includes a display panel and a polarizer positioned above the display panel. The display panel includes a flat-surface part having a flat state and a curved-surface part having a curved state. The flat-surface part is adjacent to the curved-surface part. The polarizer includes a first polarization region corresponding to the flat-surface part and a second polarization region corresponding to the curved-surface part. The polarizer comprises a hard coating layer, positioned on the first polarization region.

In the above-mentioned embodiments, the description of each embodiment has its own focus. For parts that are not described in detail in an embodiment, reference may be made to related descriptions of other embodiments.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A display device, comprising:
a display panel, the display panel comprising a flat-surface part having a flat state and a curved-surface part having a curved state, wherein the flat-surface part is adjacent to the curved-surface part; and
a polarizer positioned above the display panel, the polarizer comprising a first polarization region opposite to the flat-surface part and a second polarization region opposite to the curved-surface part,
wherein the polarizer comprises: a hard coating layer positioned in the first polarization region and outside the second polarization region; and a first supporting layer positioned in the second polarization region and outside the first polarization region;
the first supporting layer is joined with the hard coating layer to form an outermost layer of the polarizer; and
an elongation at break of the first supporting layer is greater than an elongation at break of the hard coating layer.

2. The display device of claim 1, wherein the polarizer further comprises:
a second supporting layer positioned between the display panel and the first supporting layer and located in the first polarization region and the second polarization region; and
the first supporting layer comprises a same material as the second supporting layer.

3. The display device of claim 2, wherein the second supporting layer is manufactured with cyclo-olefin copolymer or cellulose acetate.

4. The display device of claim 2, wherein the polarizer further comprises a first adhesive layer and a line polarization layer positioned between the display panel and the second supporting layer; the line polarization layer is positioned between the first adhesive layer and the second supporting layer; the first adhesive layer is located in the first polarization region and the second polarization region, the line polarization layer is located in the first polarization region and the second polarization region; and elongations at break of the first adhesive layer and the line polarization layer are both higher than the elongation at break of the hard coating layer.

5. The display device of claim 4, wherein the polarizer further comprises a compensation layer and a second adhesive layer positioned between the first adhesive layer and the line polarization layer; the compensation layer is positioned between the first adhesive layer and the second adhesive layer; the compensation layer is located in the first polarization region and the second polarization region; the second adhesive region is located in the first polarization region and the second polarization region; and elongations at break of the second adhesive layer and the compensation layer are both higher than the elongation at break of the hard coating layer.

6. The display device of claim 5, wherein the second adhesive layer is adjacent to the line polarization layer.

7. The display device of claim 6, wherein the compensation layer is manufactured with cyclo-olefin copolymer or polycarbonate.

8. The display device of claim 5, wherein the polarizer further comprises:
a third supporting layer positioned between the second adhesive layer and the line polarization layer;
wherein the third supporting layer is located in the first polarization region and the second polarization region, and the third supporting layer comprises a same material as the second supporting layer.

9. The display device of claim 8, wherein a material of the compensation layer comprises a liquid crystal polymer material.

10. The display device of claim 1, wherein the flat-surface part comprises a first flat-surface part and a second flat-surface part positioned with an interval; and the curved-surface part connects the first flat-surface part to the second flat-surface part.

* * * * *